United States Patent [19]

Mollinger et al.

[11] Patent Number: 4,670,181
[45] Date of Patent: Jun. 2, 1987

[54] PROCESS FOR PELLETIZATION OF POWDER MATERIALS AND PRODUCTS THEREFROM

[75] Inventors: Paul J. Mollinger; Charles C. Kuo, both of Avon Lake, Ohio

[73] Assignee: The B. F. Goodrich Company, Akron, Ohio

[21] Appl. No.: 772,076

[22] Filed: Aug. 30, 1985

Related U.S. Application Data

[63] Continuation-in-part of Ser. No. 624,301, Jun. 25, 1984, abandoned.

[51] Int. Cl.$^4$ .................................................. C09K 3/00
[52] U.S. Cl. .............................. 252/186.25; 252/182; 252/184; 252/384; 23/313 R; 524/83; 524/201; 524/556; 524/555; 524/557; 524/563; 428/402; 523/351; 525/332.7

[58] Field of Search .................... 23/313; 428/402; 524/201, 83, 557, 556, 555, 563; 525/332.7; 523/351; 252/182, 186.25, 184, 384

[56] References Cited

U.S. PATENT DOCUMENTS

| | | | |
|---|---|---|---|
| 3,171,734 | 2/1965 | Berson et al. | 524/557 |
| 3,362,913 | 1/1968 | Bale et al. | 252/182 |
| 4,032,469 | 6/1977 | Bartzsch | 252/182 |

Primary Examiner—Paul R. Michl
Assistant Examiner—Alex H. Walker
Attorney, Agent, or Firm—Alan A. Csontos; Philip P. McCann

[57] ABSTRACT

A method for the production of small, dustless, free-flowing pellets of powder chemical additives utilizing a high molecular weight polymeric binder, such as polyvinyl alcohol; a surfactant containing oxyethylene groups; and water.

12 Claims, 1 Drawing Figure

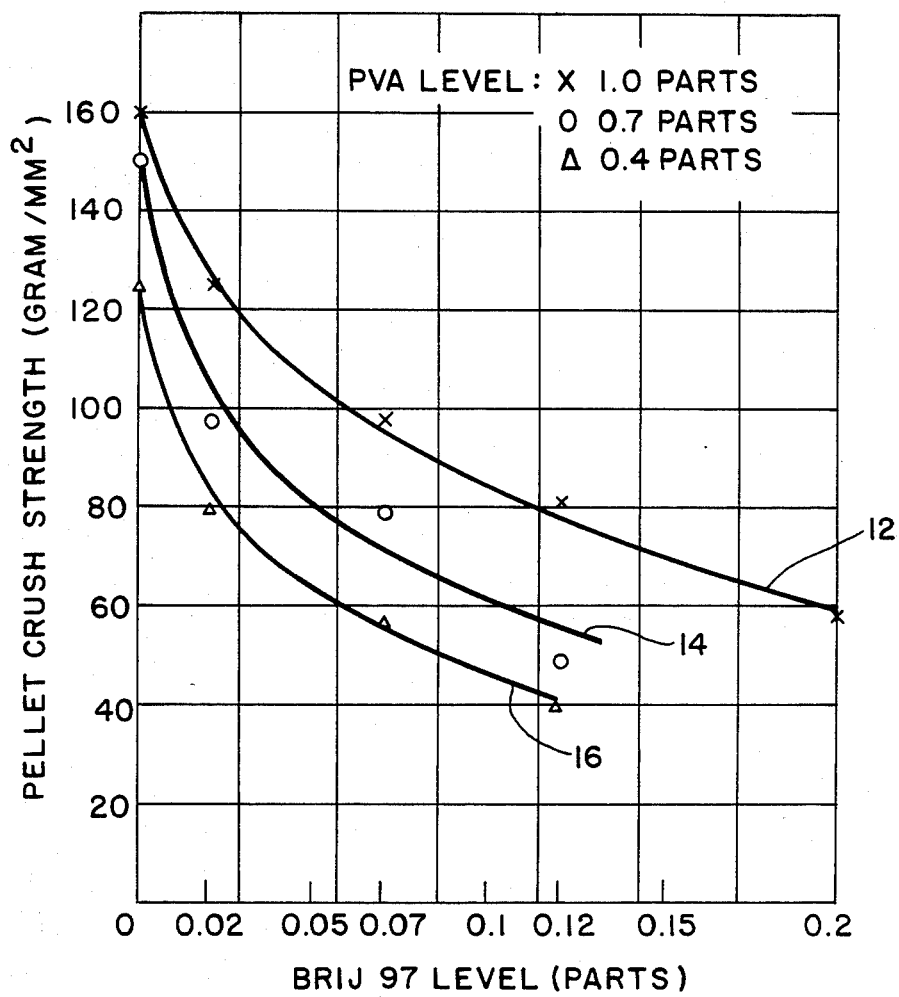

PROCESS FOR PELLETIZATION OF POWDER MATERIALS AND PRODUCTS THEREFROM

This is a continuation-in-part of U.S. patent application Ser. No. 624,301, filed June 25, 1984, now abandoned.

BACKGROUND OF THE INVENTION

The market demand for dustless and free-flowing chemical products has increased significantly and is likely to continue in this trend. The demand for dust-free, flowable materials is especially high in the compounding of rubber and polymeric compositions.

The use of finely divided materials in compounding of natural and synthetic rubber presents dusting problems which may have adverse consequences relative to productivity, contamination, environmental pollution, and safety. The finely divided nature of most rubber additives causes them to be blown into the air during production operations such as conveying, mixing or milling. This results in a production efficiency reduction due to the loss of some additives. Additionally, the dusting problem can result in the possible contamination of other materials. Further, airborne dust causes environmental and housekeeping problems, as well as safety hazards created by the explosive nature of finely divided dust. Bridging problems of powder materials also adversely affect their use in automatic feeding systems. Thus, it is desirable to have rubber and polymer additives in a dustless, free-flowing form with good dispersion properties so that processors can meet environmental regulations, application needs, and implement automatic feeding systems for improved productivity.

Efforts have been made in the art to eliminate the problems associated with finely divided materials by converting such materials into agglomerates. To form such agglomerates, generally a binder must be added to the finely divided materials. Frequently, this binder has been a material which was objectionable when mixed into a rubber compound with which the finely divided material was used. Some of the prior art agglomerates were cohesive and thus not free-flowing, and do not lend themselves to normal or automatic handling and weighting procedures. Some materials employed for preparing prior art agglomerates were used in such large amounts that they diluted the rubber ingredients or did not readily disperse in rubber during mixing. Such binders are generally classified as matrix-type binders wherein the binder material fills the space between the solid particles throughout the agglomerate resulting in the solid particles of the chemical powder additive imbedded in a more or less continuous matrix. The amount of matrix-type binder required for chemical products for the compounding of rubber and polymeric compositions is in the range of about 10% to about 20% or higher. Matrix-type binders are generally water insoluble since a water soluble matrix-type binder would be dissolved in an aqueous solution. An example of such a matrix-type binder is found in U.S. Pat. No. 3,362,913. It has been found that such matrix-type binders remain in the chemical product and are found in the final product at a high level which is undesirable in some applications.

Minimum amounts of the binder in agglomerates are desirable for shipping and dispersion. The amount of binder utilized can be minimized by the use of film-type binders wherein the binder encapsulates the particle and does not fill the space between the particles resulting in an average decreased distance between particles.

However, for pellets, the amount of binder is limited by a required physical property called the pellet crust strength. The pellet strength is measured by applying weight on the pellet until it is crushed and then dividing the total weight applied by the cross section area of the pellet where the weight is applied to. A desirable range of crush strength suitable for both shipping in bags and dispersion is about 10 to about 35 gm/mm$^2$.

In addition, the chemical powder additive must completely disintegrate into its component particles when it is mixed with the rubber or other plastic substances under pressure and dispersed homogeneously therein. Also, the added binder must not impair the stability of the chemical powder additive and the characteristics of the rubber or plastics.

In many of the prior art agglomerates, the pellet crush strength was either too low or too high. Agglomerates with too low of a crush strength are undesirable because of their inability to withstand normal shipping and handling. Agglomerates having too high of a crush strength generally had poor dispersing properties and did not mix well. Typical processes for agglomerating powder materials are disclosed in U.S. Pat. Nos. 4,362,559; 4,194,901; and 4,298,858; Canadian Patent No. 890,833; Japanese Patent Nos. 78 90,116; 78 66,923; 8,205,731 and 82,192,439; and Czech Patent No. 185,383.

It is the objective of the present invention to solve the above problems associated with powder materials and prior art agglomerates by providing a pelletization process for making small, dustless, and free-flowing products which have good dispersion properties. It is a further objective of the present invention to produce pellets of chemical additives which have a very low level of binders and other processing aids. A major advantage of the present invention is the production of pellets with a pellet crush strength range suitable for both shipping and effective dispersion, which is controllable to customer specification.

SUMMARY OF THE INVENTION

This invention relates to a dustless pellet and a method for producing dustless pellets from powders, particularly powder additives for rubber and polymers, which comprises using a processing aid system essentially containing an effective amount of (1) a high molecular weight water-soluble polymeric film-type binder, (2) an organic surfactant, and (3) water. The polymeric binder is preferably polyvinyl alcohol or a cellulose derivative. The surfactant preferably contains a polyoxyethylene group. The current method is particularly suitable for the formation of pellets by a screw extrusion process and yields small, dustless, and free-flowing pellets which have good dispersion properties which equal or exceed that of the powder.

BRIEF DESCRIPTION OF THE DRAWING

The drawing shows three graphs wherein each graph shows the relationship of the binder and surfactant with the pellet crush strength.

DETAILED DESCRIPTION

The present invention relates to a novel method for the production of dustless pellets from powders and to the pellet products produced thereby. The method comprises using a processing aid system essentially containing an effective amount of a high molecular weight water-soluble polymeric film-type binder, an organic surfactant, and water. Although the method may be carried out utilizing a variety of agglomeration techniques, such as roll pressing, pellet milling, spray drying, and screw extrusion, the method is particularly suitable for pellet formation using screw extrusion.

Powders which are suitable for pelletization utilizing the present invention can be any chemical powder substantially insoluble in water wherein the powder can be used as a process additive in polymers. The present method is particularly suited for pelletizing chemical powders of organic rubber chemicals and chemical additives for plastic polymers. Suitable powders include a size from about 5 microns average particle size to about 200 microns average particle size and preferably from about 10 microns average particle size to about 50 microns average particle size. The maximum particle size should not exceed about 500 microns. Suitable powders include, for example, accelerators, vulcanizing agents, pigments, stabilizers, antioxidants, fillers, curing additives, reinforcing agents, and the like.

Binders are essential aids to economic and effective agglomeration of solids. In the screw extrusion process particularly, the pressure applied is not sufficiently high for compaction and a binder is needed to agglomerate the powders. In order to obtain uniform pellet strength with a very low processing aid ingredient content in the final product, high molecular weight water soluble polymeric film-type binders are used in practicing this invention. These high molecular weight polymeric film-type binders work well with water to provide a thin film between powder particles, and to entangle the particles into agglomerates which exhibit improved plasticity under shear force and pressure. Additionally, such binders exhibit the characteristic during drying of the film-forming polymer wicking with the water to the surface of the pellet. Suitable polymeric film-type binders for the practice of this invention include most water-soluble film-forming resins; for example, partially and fully-hydrolyzed polyvinyl alcohols, polyacrylamides, acrylamide-acrylic acid copolymers, starches, polyacrylic acids, ethylene oxide polymers and alkyl and hydroxylalkyl cellulose derivatives, such as, for example, methyl cellulose, hydroxy propyl methyl cellulose, hydroxy ethyl cellulose, carboxyl methyl cellulose, carboxyl methyl hydroxy ethyl cellulose, and the like.

Suitable concentration of binder ranges from about 0.2 to about 4 parts by weight per 100 parts of dry powder, preferably from about 0.2 to about 2 parts. The preferred film-type binder is a polyvinyl alcohol or an alkyl or hydroxyalkyl cellulose derivative. Most preferably, the polyvinyl alcohol has a molecular weight of 10,000 or greater.

The present invention involves the use of an organic surfactant to obtain pellets having the desired characteristics. Suitable organic surfactants include, for example, water soluble or dispersible nonionic surfactants, propylene glycols and polymeric surfactants such as the polyoxyethylene derivatives. The preferred organic surfactants for the practice of this invention are the polyoxyethylene derivatives, such as, for example, polyoxyethylene acids, polyoxyethylene alcohols, oxyethylene-oxypropylene copolymer, and the like. More preferably, the organic surfactant contains more than two oxyethylene units, and most preferably the surfactant is a polyoxyethylene oleyl ether or a polyoxyethylene stearate. In order to work effectively in the present invention, the surfactant must be stable with the powder chemical additives, especially with accelerators, during processing and storage, and must be fairly soluble in water. Specifically, polyoxyethylene (10) oleyl ether, polyoxyethylene (20) oleyl ether, and polyoxyethylene (50) stearate were found to work well in the process of this invention.

The use of an organic surfactant is critical for the practice of the present invention regardless of the method of agglomeration used. The use of a surfactant is especially important in pelletization by the screw extrusion process. The surfactant makes the production of desired pellets with screw extrusion possible and provides the following multi-functions:

(1) The surfactant serves as a wetting agent to help the aqueous solution wet the particle surfaces of organic powder. Wetting is important for uniformly spreading the film-type binder on powder particles to provide good and uniform binding and reduces the amount of binder required.

(2) The surfactant serves as a lubricant and plasticity improving agent. This improves the plasticity of the whole mass and makes it easier to extrude into the desired shape. This also reduces extruder power requirements and increases extruder output.

(3) Most importantly, the surfactant acts as a pellet crush strength controller. By adjusting the ratio of primary binder and surfactant, plasticity, ingredient content, and pellet strength can be controlled to desired levels. In particular, as shown in the drawing, crush strength of the pellet can be controlled by the ratio of the binder to the surfactant. The binder without the desired level of surfactant does not provide the desired level of pellet strength. In particular, in the drawing, the three graphs, 12, 14 and 16, show the relationship of the amount of film-type binder and a surfactant with the pellet crush strength.

Suitable levels of surfactant ranges from about 0.2 to about 1.0 parts by weight per 100 parts of dry powder.

Another important component of the processing aid system used in the practice of this invention is water. The primary function of water is to dissolve and carry ingredients such as the binder and surfactant. Water works with the binder and surfactant to provide the lubrication between particles and plasticity for the whole mass. Water also contributes binding action through capillary force in the wet pellet due to its high surface tension. The amount of water needed to wet the particle surface and fill the space between the particles is determined by the particle size, shape, tacking and other surface properties of the powder particles. Typically the amount of water ranges from about 10 parts to about 45 parts by weight per 100 parts of dry powder. The water may be added directly to the binder and surfactant or it may be present in wet filter cakes of the powder chemical additives. Where wet filter cakes of the additives are used, the dry binder and surfactant may be added to the filter cakes by blending prior to the pelletization step.

In the preferred embodiment of this invention, three main steps are involved, i.e., mixing, extruding and drying. Other agglomerating techniques may be used instead of extrusion, such as, for example, roll pressing, pellet milling, and spray drying. The binder and the surfactants can be dissolved or dispersed in water and subsequently mixed with the dry powder. The dry binder and surfactant can also be mixed with wet powder and then fed to the extruder. The mix is agglomerated through a screw extruder into extrudates. The extrudates are then broken into short pellets either outside or inside of a dryer and dried in the dryer. The present process allows the pellet cutting or breaking to be performed with the minimal generation of fines. In the process, about 98% of the powder is converted to pellets and less than 2% as fines.

Good mixing is important for uniformly spreading liquid and processing aids on the powder particle surfaces, and any conventional mixing equipment may be used. Good mixing provides the uniformity of feed material for extruding and, thus, the uniform quality of the final product.

The present invention yields small, dustless, free-flowing pellets with a satisfactory crush strength and a low level of processing aid ingredients. These pellets can meet the needs of practically all applications in the rubber and plastic industries. Pellet crush strength is important for shipping and for dispersion. If the pellet is too soft, it cannot withstand shipping and handling conditions, but if it is too hard, it causes dispersion problems during compounding. A pellet crush strength in the range of about 10 to about 35 gm/mm$^2$ is preferred for effective shipping and dispersion. One major advantage of the present process is that the pellet strength can be adjusted by changing the amount of binder and surfactant utilized. Pellets having crush strengths from about 5-100 gm/mm$^2$ are obtainable. However, a more preferred pellet crush strength range is about 15-30 grams/mm$^2$.

The flexibility of making a wide range of uniform pellet sizes is another major advantage of this process. Preferably the pellet size ranges from about 0.5 mm to about 2 mm in diameter and from about 1 mm to about 4 mm in length. Small pellets of this size exhibit better dispersion and flowability properties. The pellets can be cylindrical in shape and have an angle of repose smaller than 40°.

After the pellets are dried, the processing aid ingredients in the final pellet product essentially consist of binder and surfactant. A suitable final pellet product should contain about 4% or less of processing aid ingredients on a dry weight basis; preferably about 2% or less; and most preferably less than 1%.

EXAMPLES 1-4

To illustrate this invention, pellets were made following the present inventive process from dry powders of accelerators for rubber. In each example, the binder and surfactant were dissolved in water and subsequently mixed with the dry accelerator powder. The mix was then screw extruded, pelletized, dried and evaluated. The specific recipes used are given in Table I. In all Examples, 100 parts by weight of dry accelerator powder were used.

TABLE I

| | EXAMPLES | | | |
|---|---|---|---|---|
| Accelerator (100 pbw) | I (OTOS) | II (BBTS) | III (OMTS) | IV (MBTS) |
| Binder (Polyvinyl Alcohol) | 0.25 | 0.75 | 0.40 | 0.25 |
| Surfactant (Polyoxyethylene (10) oleyl ether) | 0.25 | 0.50 | 0.60 | 0.20 |

TABLE I-continued

| | EXAMPLES | | | |
|---|---|---|---|---|
| Accelerator (100 pbw) | I (OTOS) | II (BBTS) | III (OMTS) | IV (MBTS) |
| Water | 14 | 40 | 22 | 43 |

OTOS = N—oxydiethylene thiocarbamyl N'—oxydiethylene sulfenamide
BBTS = N—t-butyl-2-benzothiazole sulfenamide
MBTS = 2-mercapto benzothiazole disulfide
OMTS = MBTS/N—oxydiethylene-2-benzothiazole sulfenamide
All amounts are parts by weight.

In all Examples, essentially dustless, cylindrical pellets were made. The pellets were free-flowing and had angles of repose smaller than 40°. The pellet crush strength in the Examples ranged from 20-35 grams/mm$^2$. Pellet sizes ranged from 1 to 2 mm in diameter and from 1 to 4 mm in length. Pellet size was uniform with nearly all the particles being retained on 10-12 mesh screens.

Pellets of OTOS made by the present process were evaluated in a typical styrene-butadiene rubber stock. Vulcanizates of the stock were cured for 15 minutes at 320° F. (160° C.) and tested for stress/strain properties. The OTOS pellets were compared to an equivalent amount of powder to evaluate dispersibility. Poor dispersibility is usually reflected by a lower tensile strength and lower elongation. The results are presented in Table II.

TABLE II

| | OTOS Powder (control) | OTOS Pellet |
|---|---|---|
| Tensile strength (psi) | 2744 | 3016 |
| Elongation (%) | 526 | 566 |
| 300% modulus (psi) | 1319 | 1322 |

We claim:

1. In a method for producing dustless, free-flowing pellets from a water-insoluble chemical powder additive for rubber and polymers, the improvement which comprises using as the processing aid system per 100 parts by weight of said powder additive, (1) from about 0.2 to about 4 parts by weight of a high molecular weight water-soluble polymeric film-type binder selected from the group consisting of partially- or fully-hydrolyzed polyvinyl alcohols, alkyl or hydroxyalkyl celluloses, polyacrylamides, acrylamide acrylic acid copolymers, starches, polyacrylic acids, and ethylene oxide polymers; (2) from about 0.2 to about 1 part by weight of a water-soluble or dispersible organic surfactant; and (3) water.

2. A method of claim 1 wherein the surfactant is a polyoxyethylene derivative.

3. A method of claim 2 wherein the surfactant is a polyoxyethylene oleyl ether or a polyoxyethylene stearate.

4. A method of claim 2 wherein the total amount of the processing aid system in the final pellet is about 4% or less on a dry weight basis.

5. A method of claim 3 wherein the powder chemical additive is one or more compounds selected from the group consisting of N-oxydiethylene thiocarbamyl N'-oxydiethylene sulfenamide, N-t-butyl-2-benzothizaloe sulfenamide, 2-mercapto benzothiazole disulfide, and N-oxydiethylene-2-benzothiazole sulfenamide.

6. A method of claim 1 wherein said pellets are formed by screw extrusion.

7. A method of claim 6 wherein the pellet size ranges from about 0.5 to about 2 mm in diameter and from about 2 to about 4 mm in length.

8. A pellet product made by combining one or more water-insoluble chemical powder additives for rubbers and organic polymers with a processing aid system containing essentially, per 100 parts by weight of aid powder additives, (1) from about 0.2 to about 4 parts by weight of a high molecular weight water-soluble polymeric film-type binder selected from the group consisting of partially- or fully-hydrolyzed polyvinyl alcohols, alkyl or hydroxyalkyl celluloses, polyacrylamides, acrylamide-acrylic acid copolymers, starches, polyacrylic acids, and ethylene oxide polymers; (2) from about 0.2 to about 1 part by weight of a water-soluble or dispersible organic surfactant; and (3) water, and drying the combination.

9. A pellet product essentially comprising (1) one or more chemical powder additives for rubber and polymers; (2) from about 0.2 to about 4 parts by weight, per 100 parts by weight of said additive(s), of a high molecular weight water-soluble polymeric binder selected from the group consisting of partially- or fully-hydrolyzed polyvinyl alcohols, alkyl or hydroxyalkyl celluloses, polyacrylamides, acrylamide-acrylic acid copolymers, starches, polyacrylic acids, and ethylene oxide polymers; and (3) from about 0.2 to about 1 part by weight, per 100 parts by weight of said additive(s) of a water-soluble or dispersible organic surfactant.

10. A pellet product of claim 9 wherein the surfactant is a polyoxyethylene derivative.

11. A pellel product of claim 9 wherein the surfactant is a polyoxyethylene oleyl ether or a polyoxyethylene stearate.

12. A pellet product of claim 11 wherein the chemical polymer additive is one or more compounds selected from the group consisting of N-oxydiethylene thiocarbamyl-N'oxydiethylene sulfenamide, N-t-butyl-2-benzothiazole sulfenamide, 2-mercaptobenzothia disulfide, and N-oxydiethylene-2-denzothiazole sulfenamide.

* * * * *

UNITED STATES PATENT AND TRADEMARK OFFICE
CERTIFICATE OF CORRECTION

PATENT NO. : 4,670,181
DATED : June 2, 1987
INVENTOR(S) : PAUL J. MOLLINGER and CHARLES C. KUO It is certified that error appears in the above-identified patent and that said Letters Patent is hereby corrected as shown below:

Column 8, line 19 "2-mercaptobenzothia" should read 2-mercaptobenzothiazole

Signed and Sealed this

Twenty-eighth Day of November 1989

Attest:

JEFFREY M. SAMUELS

Attesting Officer     Acting Commissioner of Patents and Trademarks